(12) United States Patent
Coffin et al.

(10) Patent No.: US 7,569,099 B2
(45) Date of Patent: Aug. 4, 2009

(54) FUEL DEOXYGENATION SYSTEM WITH NON-METALLIC FUEL PLATE ASSEMBLY

(75) Inventors: Charles C. Coffin, Vernon, CT (US); Thomas G. Tillman, West Hartford, CT (US); He Huang, Glastonbury, CT (US); Brian M. Welch, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 528 days.

(21) Appl. No.: 11/334,590

(22) Filed: Jan. 18, 2006

(65) Prior Publication Data
US 2007/0163439 A1 Jul. 19, 2007

(51) Int. Cl.
B01D 53/22 (2006.01)

(52) U.S. Cl. .............. 96/6; 96/7; 96/9; 96/11; 96/12; 95/46; 95/54; 55/502; 55/DIG. 5; 210/640

(58) Field of Classification Search ........ 96/4, 96/6, 7, 9, 11, 12, 13, 14; 55/502, DIG. 5; 210/640, 641, 650; 95/46, 54
See application file for complete search history.

(56) References Cited

U.S. PATENT DOCUMENTS

| | | |
|---|---|---|
| 4,371,385 A | 2/1983 | Johnson |
| 4,516,984 A | 5/1985 | Warner et al. |
| 4,602,923 A | 7/1986 | Bernstein |
| 4,729,773 A | 3/1988 | Shirato et al. |
| 4,955,992 A | 9/1990 | Goodale et al. |
| 5,015,388 A * | 5/1991 | Pusineri et al. ............ 210/641 |
| 5,053,060 A | 10/1991 | Kopf-Sill et al. |
| 5,078,755 A | 1/1992 | Tozawa et al. |
| 5,123,937 A | 6/1992 | Shibata et al. |
| 5,153,396 A * | 10/1992 | Cummings ............... 200/83 Q |
| 5,154,832 A | 10/1992 | Yamamura et al. |
| 5,340,384 A | 8/1994 | Sims |
| 5,410,052 A | 4/1995 | Smith et al. |

(Continued)

FOREIGN PATENT DOCUMENTS

DE 4446270 2/1996

(Continued)

OTHER PUBLICATIONS

U.S. Appl. No. 11/334,126, entitled "A Method for Enhancing Mass Transport in Fuel Deoxygenation Systems," filed Jan. 18, 2006.

(Continued)

Primary Examiner—Jason M Greene
(74) Attorney, Agent, or Firm—Carlson, Gaskey & Olds PC

(57) ABSTRACT

A fuel system for an energy conversion device includes a multiple of non-metallic fuel plates, gaskets, oxygen permeable membranes, porous substrate plates, and vacuum frame plates. Intricate 3-dimension fuel channel structures such as laminar flow impingement elements within the fuel channel dramatically enhance oxygen diffusivity in the FSU. The fuel plates are manufactured from a relatively soft non-metallic material. The non-metallic fuel plates and gasket arrangement provide an effective sealing interface between the fuel plate and oxygen permeable membrane, since compression may be applied to the plates without damaging the relatively delicate oxygen permeable membrane.

17 Claims, 15 Drawing Sheets

U.S. PATENT DOCUMENTS

| | | | |
|---|---|---|---|
| 5,482,860 A | 1/1996 | Copeland et al. | |
| 5,522,917 A | 6/1996 | Honda et al. | |
| 5,693,122 A * | 12/1997 | Berndt | 96/6 |
| 5,695,545 A | 12/1997 | Cho et al. | |
| 5,888,275 A | 3/1999 | Hamasaki et al. | |
| 5,902,382 A | 5/1999 | Campain et al. | |
| 5,902,747 A | 5/1999 | Nemser et al. | |
| 6,106,591 A | 8/2000 | Keskar et al. | |
| 6,168,648 B1 | 1/2001 | Ootani et al. | |
| 6,258,154 B1 | 7/2001 | Berndt et al. | |
| 6,309,444 B1 | 10/2001 | Sims et al. | |
| 6,315,815 B1 | 11/2001 | Spadaccini et al. | |
| 6,379,796 B1 | 4/2002 | Uenishi et al. | |
| 6,402,810 B1 | 6/2002 | Mayer et al. | |
| 6,402,818 B1 | 6/2002 | Sengupta | |
| 6,419,726 B1 * | 7/2002 | Frost et al. | 95/56 |
| 6,494,614 B1 | 12/2002 | Bennett et al. | |
| 6,494,938 B2 | 12/2002 | Sims et al. | |
| 6,616,841 B2 | 9/2003 | Cho et al. | |
| 6,623,637 B1 | 9/2003 | Monzen et al. | |
| 6,682,016 B1 | 1/2004 | Peroulakis | |
| 6,709,492 B1 * | 3/2004 | Spadaccini et al. | 96/6 |
| 7,311,760 B2 * | 12/2007 | Matsumura et al. | 96/7 |
| 2001/0035093 A1 | 11/2001 | Yokota | |
| 2002/0195385 A1 | 12/2002 | Cho et al. | |
| 2003/0116015 A1 | 6/2003 | Sengupta et al. | |
| 2003/0148164 A1 | 8/2003 | Koch et al. | |
| 2003/0151156 A1 | 8/2003 | Crumm et al. | |
| 2003/0161785 A1 | 8/2003 | Dieckmann | |
| 2003/0219637 A1 | 11/2003 | Coors | |
| 2004/0025696 A1 | 2/2004 | Varrin, Jr. et al. | |
| 2004/0028988 A1 | 2/2004 | Bunker | |
| 2004/0050786 A1 | 3/2004 | Dey et al. | |
| 2004/0094463 A1 | 5/2004 | Laverdiere et al. | |
| 2004/0194627 A1 * | 10/2004 | Huang et al. | 96/6 |

FOREIGN PATENT DOCUMENTS

| | | |
|---|---|---|
| EP | 0273267 | 7/1988 |
| EP | 0334774 | 9/1989 |
| EP | 0354797 | 2/1990 |
| EP | 0460512 | 12/1991 |
| EP | 0493869 | 7/1992 |
| EP | 0552090 | 7/1993 |
| EP | 0576677 | 1/1994 |
| EP | 0583748 | 2/1994 |
| EP | 0622475 | 11/1994 |
| EP | 0750322 | 12/1996 |
| EP | 0963229 | 8/1998 |
| EP | 09070738 | 1/2000 |
| EP | 1018353 | 7/2000 |
| EP | 1052011 | 11/2000 |
| EP | 1210971 | 6/2002 |
| EP | 1239189 | 9/2002 |
| EP | 1270063 | 1/2003 |
| EP | 1277504 | 1/2003 |
| JP | 63151307 | 6/1988 |
| JP | 3169304 | 7/1991 |
| JP | 3193106 | 8/1991 |
| JP | 5084474 | 4/1993 |
| JP | 5317605 | 12/1993 |
| JP | 7080205 | 3/1995 |
| JP | 7227504 | 8/1995 |
| JP | 8000906 | 1/1996 |
| JP | 8332306 | 12/1996 |
| JP | 10174803 | 6/1998 |
| JP | 10216404 | 8/1998 |
| JP | 11009902 | 1/1999 |
| JP | 11033373 | 2/1999 |
| JP | 11244607 | 9/1999 |
| JP | 2000051606 | 2/2000 |
| JP | 2000084368 | 3/2000 |
| JP | 20000140505 | 5/2000 |
| JP | 20000262871 | 9/2000 |
| JP | 2000288366 | 10/2000 |
| JP | 2000350902 | 12/2000 |
| JP | 2003010604 | 1/2003 |
| JP | 2003062403 | 3/2003 |
| JP | 2003200024 | 7/2003 |
| JP | 2003245525 | 9/2003 |
| WO | 87/07525 | 12/1987 |
| WO | WO 94/16800 | 8/1994 |
| WO | 96/07885 | 3/1996 |
| WO | WO 97/02190 | 1/1997 |
| WO | WO 99/39811 | 8/1999 |
| WO | WO 00/44479 | 8/2000 |
| WO | WO 00/44482 | 8/2000 |
| WO | WO 03/029744 | 4/2003 |
| WO | WO 03/036747 | 5/2003 |
| WO | WO 03/080228 | 10/2003 |
| WO | WO 03/086573 | 10/2003 |
| WO | WO 2004/007060 | 1/2004 |
| WO | WO 2004/041397 | 5/2004 |
| WO | 2005/025718 | 3/2005 |

OTHER PUBLICATIONS

U.S. Appl. No. 11/265,845, entitled "Fuel Deoxygenation System with Multi-Layer Oxygen Permeable Membrane," filed Nov. 3, 2005.

U.S. Appl. No. 11/148,508, entitled "Fuel Deoxygenation System with Non-Planar Plate Members," filed Jun. 9, 2005.

U.S. Appl. No. 11/049,175, entitled "Fuel Deoxygenation System with Textured Oxygen Permeable Membrane," filed Feb. 2, 2005.

U.S. Appl. No. 11/334,587, entitled "Fuel Deoxygenation with Non-Planar Fuel Channel and Oxygen Permeable Membrane", filed Jan. 18, 2006.

Richard W. Baker, "Membrane Technology and Applications," 2nd Edition, John Wiley & Sons, Ltd., pp. 96-103.

European Search Report dated May 23, 2007.

* cited by examiner

FUEL DEOXYGENATION SYSTEM WITH NON-METALLIC FUEL PLATE ASSEMBLY

BACKGROUND OF THE INVENTION

The present invention relates to stabilizing fuel by deoxygenation, and more particularly to a fuel plate assembly for a fuel stabilization unit.

Fuel is often utilized in aircraft as a coolant for various aircraft systems. The presence of dissolved oxygen in hydrocarbon jet fuels may be objectionable because the oxygen supports oxidation reactions that yield undesirable by-products. Dissolution of air in jet fuel results in an approximately 70 ppm oxygen concentration. When the fuel is heated between 300 and 850° F. the oxygen initiates free radical reactions of the fuel resulting in deposits commonly referred to as "coke" or "coking." Coke may be detrimental to the fuel lines and may inhibit fuel delivery. The formation of such deposits may impair the normal functioning of a fuel system, either with respect to an intended heat exchange function or the efficient injection of fuel.

Various conventional fuel deoxygenation techniques are currently utilized to deoxygenate fuel. Typically, lowering the oxygen concentration to 6 ppm or less is sufficient to overcome the coking problem.

One conventional Fuel Stabilization Unit (FSU) utilized in aircraft fuel systems removes oxygen from jet fuel by producing an oxygen partial pressure gradient across a membrane permeable to oxygen. The FSU includes a plurality of fuel plates sandwiched with permeable membranes and porous substrate plates within an outer housing. Each fuel plate defines a portion of the fuel passage and the porous plate backed permeable membranes defines the remaining portions of the fuel passages. The permeable membrane includes Teflon AF or other type of amorphous glassy polymer coating in contact with fuel within the fuel passages for preventing the bulk of liquid fuel from migrating through the permeable membrane and the porous plate.

The use of a plurality of similarly configured flat plates increases manufacturing efficiency and reduces overall cost. Further, the size and weight of the FSU is substantially reduced while increasing the capacity for removing dissolved oxygen from fuel. Moreover, the planar design is easily scalable compared to previous tubular designs.

Disadvantageously, the planar fuel plates are typically stainless steel which is relatively difficult, time-consuming, and expensive to machine while the oxygen permeable membrane is a relatively delicate, thin (~2-5 microns) film which may lack mechanical integrity. Contact between the metallic fuel plate and the oxygen permeable membrane may result in damage to the permeable membrane which necessitates careful manufacture and assembly to avoid leakage between the multitude of plates.

A failed seal between plates or a damaged permeable membrane may permit inter-stream leakage which may dramatically decrease the performance of the FSU. Sealing the interface between fuel plates, sealing the fuel channel between fuel plates and the oxygen permeable membrane, as well as sealing the vacuum path from potential leaks to ambient are critical to effective operation of the FSU. Furthermore, to increase oxygen diffusivity and enhance fuel deoxygenator performance, the fuel plate includes a relatively intricate 3-dimension fuel channel structure which further complicates sealing and manufacture.

Although effective manufacturing techniques exist for the production of the relatively intricate 3-dimension fuel channel structure and the high-precision FSU sealing gaskets, these conventional techniques are exceedingly time consuming and expensive.

Accordingly, it is desirable to provide an effective relatively inexpensive and uncomplicated fuel plate and sealing gasket arrangement for a deoxygenation system that facilitates manufacture of an intricate 3-dimension fuel channel structure to increase fuel and deoxygenation.

SUMMARY OF THE INVENTION

The fuel system for an energy conversion device according to the present invention includes a deoxygenator system that comprises a multiple of non-metallic fuel plates, gaskets, oxygen permeable membranes, porous substrate plates, epoxy film adhesive, liquid epoxy materials, and vacuum frame plates. The deoxygenator system is an on-line fuel stabilization unit (FSU) that deoxygenates fuel for use in aircraft thermal management applications. An important element of the FSU is the fuel plate. Intricate 3-dimension fuel channel structures such as laminar flow impingement elements within the fuel channel dramatically enhance oxygen diffusivity in the FSU. The fuel plates are manufactured from a relatively soft non-metallic material, such as various plastics or KAPTON®. Utilizing laser cutting with non-metallic materials permits cost-effective manufacture of relatively large area fuel plates with intricate 3-dimension fuel channel structures heretofore unavailable with metallic fuel plats.

The non-metallic fuel plates advantageously provide an effective sealing interface between the fuel plate and oxygen permeable membrane, since compression may be applied to the plates without damaging the relatively delicate oxygen permeable membrane. The non-metallic fuel plates permit manufacturing techniques for the intricate 3-dimensional fuel channel structures and correspondingly intricate sealing gaskets that seal and soften the contact between the fuel plates, the oxygen permeable membrane, and the non-metallic fuel plate as well as permit sealing within the fuel channel.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
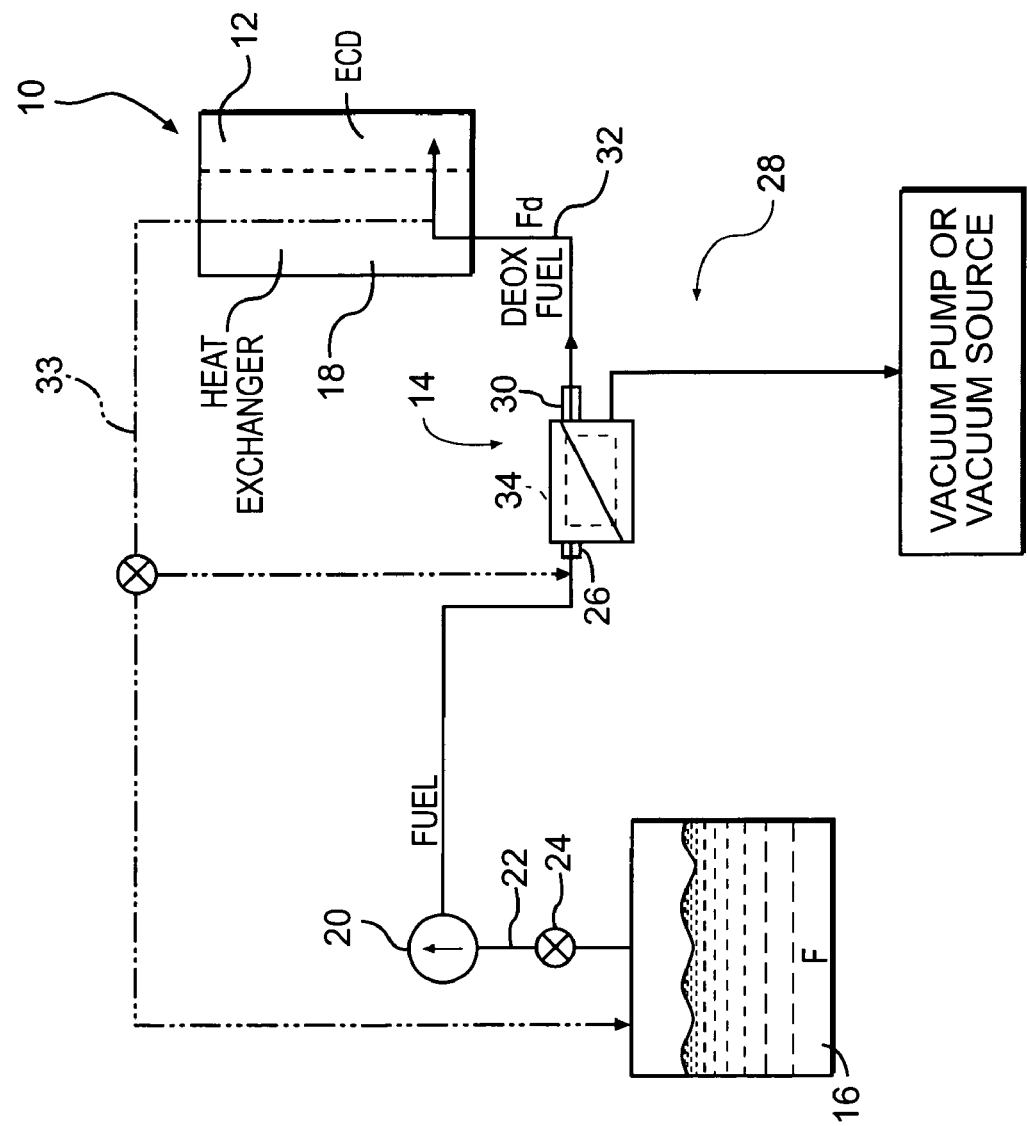
FIG. 1 is a general schematic block diagram of an energy conversion device (ECD) and an associated fuel system employing a fuel deoxygenator in accordance with the present invention.

FIG. 1 illustrates a general schematic view of a fuel system 10 for an energy conversion device (ECD) 12. A deoxygenator system 14 receives liquid fuel F from a reservoir 16 such as a fuel tank. The fuel F is typically a liquid hydrocarbon such as jet fuel. The ECD 12 may exist in a variety of forms in which the liquid hydrocarbon, at some point prior to eventual use as a lubricant, or for processing, for combustion, or for some form of energy release, acquires sufficient heat to support autoxidation reactions and coking if dissolved oxygen is present to any significant extent in the liquid hydrocarbon.

One form of the ECD 12 is a gas turbine engine, and particularly such engines in aircraft. Typically, the fuel also serves as a coolant for one or more sub-systems in the aircraft and becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system 10. The heat exchange system 18 may alternatively or additionally include a multiple of heat exchanges distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and other portions of the fuel system 10. As the fuel F passes through the deoxygenator system 14, oxygen is selectively removed into a vacuum system 28.

The deoxygenated fuel Fd flows from a fuel outlet 30 of the deoxygenation system 14 via a deoxygenated fuel conduit 32, to the heat exchange system 18 and to the ECD 12 such as the fuel injectors of a gas turbine engine. A portion of the deoxygenated fuel may be recirculated, as represented by recirculation conduit 33 to either the deoxygenation system 14 and/or the reservoir 16. It should be understood that although a particular component arrangement is disclosed in the illustrated embodiment, other arrangements will benefit from the instant invention.

Figure 2A:
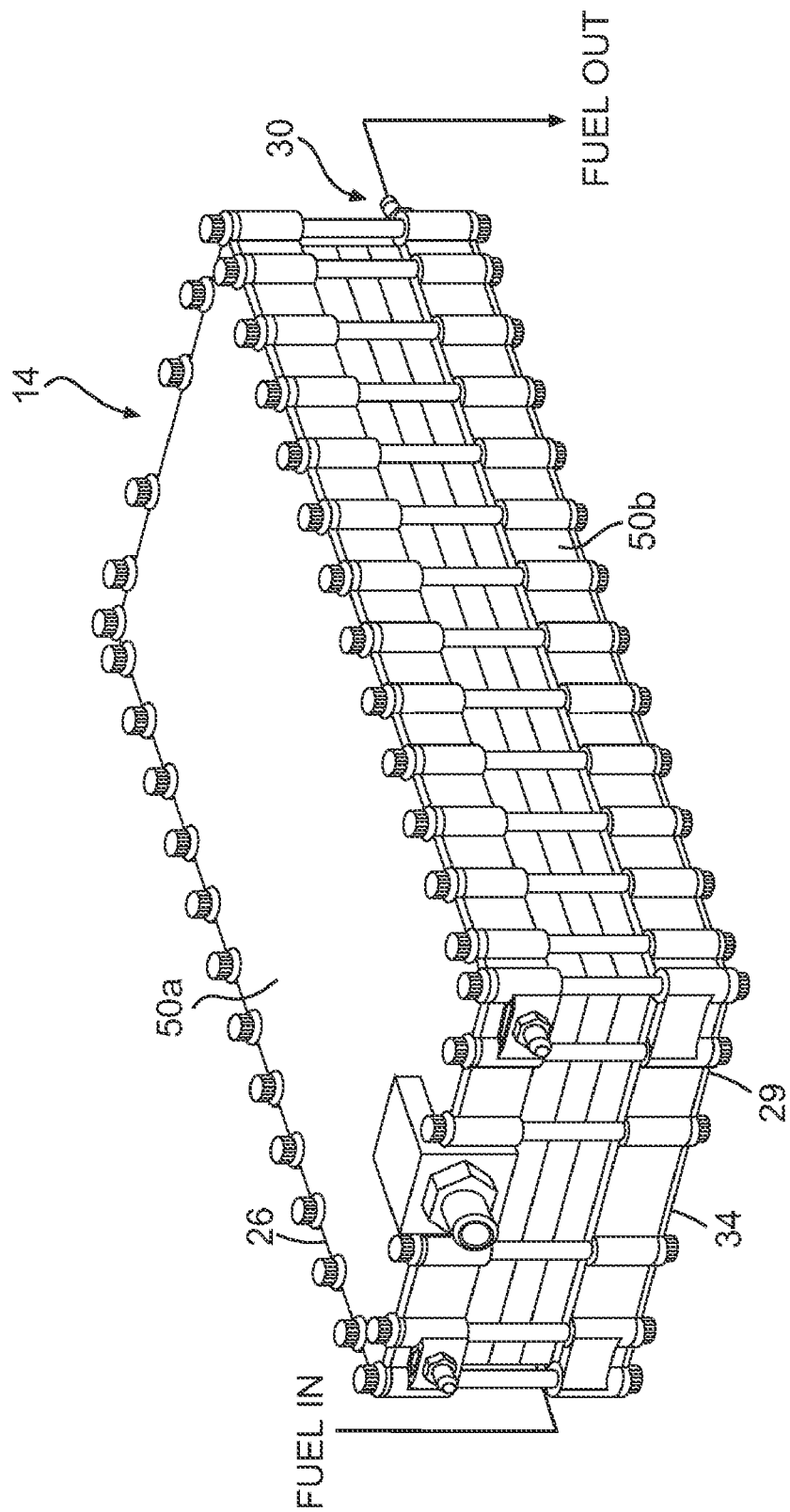
FIG. 2A is a perspective view of the fuel deoxygenator of the present invention.
Figure 2B:
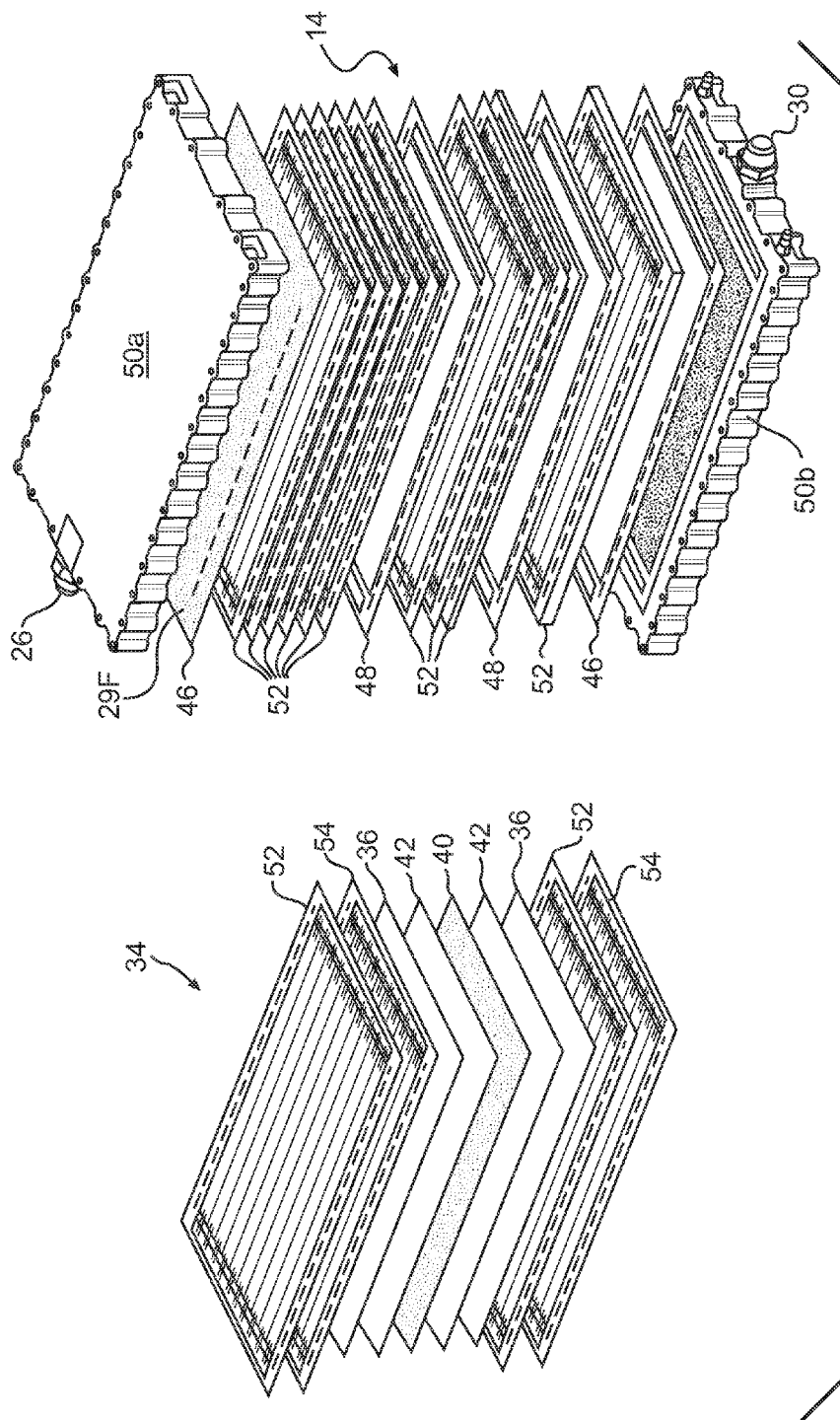
FIG. 2B is an exploded view of the fuel deoxygenator of the present invention.
Figure 3:
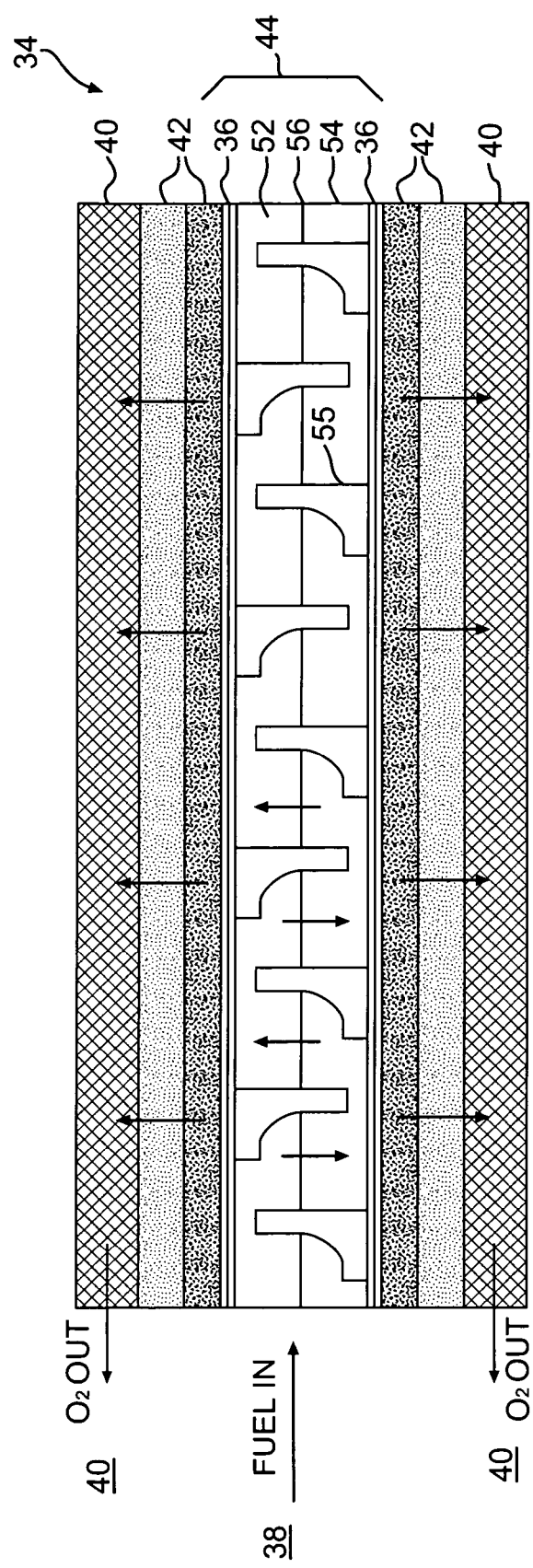
FIG. 3 is an expanded schematic sectional view of a flow channel.

Referring to FIG. 2A, the deoxygenator system 14 in one non-limiting embodiment includes a multiplicity of vacuum/fuel flow-channel assemblies 34 (FIG. 2B). The assemblies 34 include a -oxygen permeable membrane 36 between a fuel channel 38 and an oxygen receiving vacuum channel 40 which can be formed by a supporting mesh (FIG. 3). It should be understood that the channels may be of various shapes and arrangements to provide a oxygen partial pressure differential, which maintains an oxygen concentration differential across the membrane to deoxygenate the fuel.

The oxygen permeable membrane 36 allows dissolved oxygen (and other gases) to diffuse through angstrom-size voids but excludes the larger fuel molecules. Alternatively, or in conjunction with the voids, the permeable membrane 36 utilizes a solution-diffusion mechanism to dissolve and diffuse oxygen (and/or other gases) through the membrane while excluding the fuel. The family of Teflon AF which is an amorphous copolymer of perfluoro-2,2-dimethyl-1,3-dioxole (PDD) often identified under the trademark "Teflon AF" registered to E. I. DuPont de Nemours of Wilmington, Del., USA, and the family of Hyflon AD which is a copolymer of 2,2,4-trifluoro-5-trifluoromethoxy-1,3-dioxole (TDD) registered to Solvay Solexis, Milan, Italy have proven to provide effective results for fuel deoxygenation.

Fuel flowing through the fuel channel 38 is in contact with the oxygen permeable membrane 36. Vacuum creates an oxygen partial pressure differential between the inner walls of the fuel channel 38 and the oxygen permeable membrane 36 which causes diffusion of oxygen dissolved within the fuel to migrate through the porous support 42 which supports the membrane 36 and out of the deoxygenator system 14 through the oxygen receiving channel 40 separate from the fuel channel 38. For further understanding of other aspects of one membrane based fuel deoxygenator system and associated components thereof, attention is directed to U.S. Pat. No. 6,315,815 and U.S. patent application Ser. No.: 6,709,492 entitled PLANAR MEMBRANE DEOXYGENATOR which are assigned to the assignee of the instant invention and which are hereby incorporated herein in their entirety.

Figure 2C:
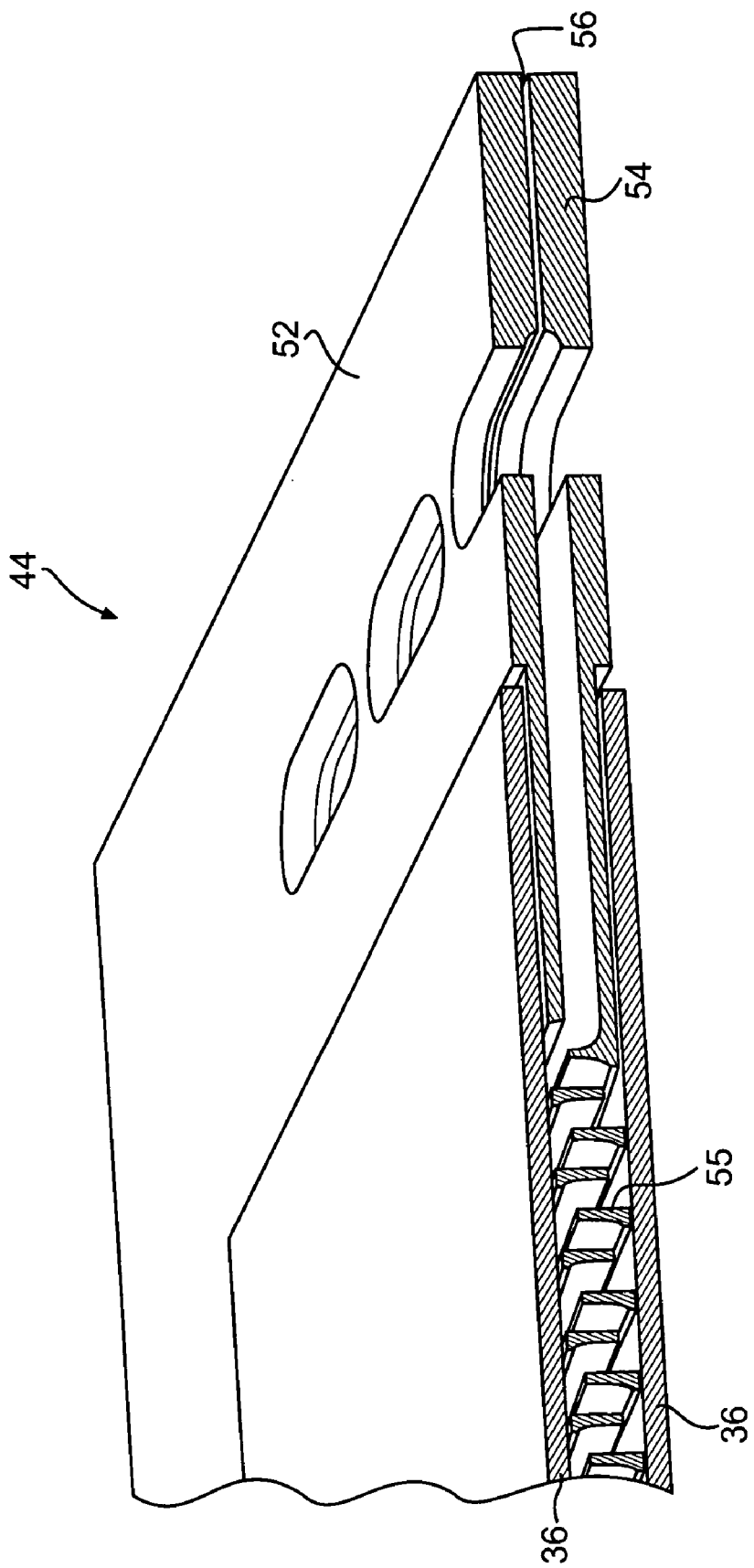
FIG. 2C is a sectioned perspective and expanded view of the deoxygenator system.
Figure 2D:
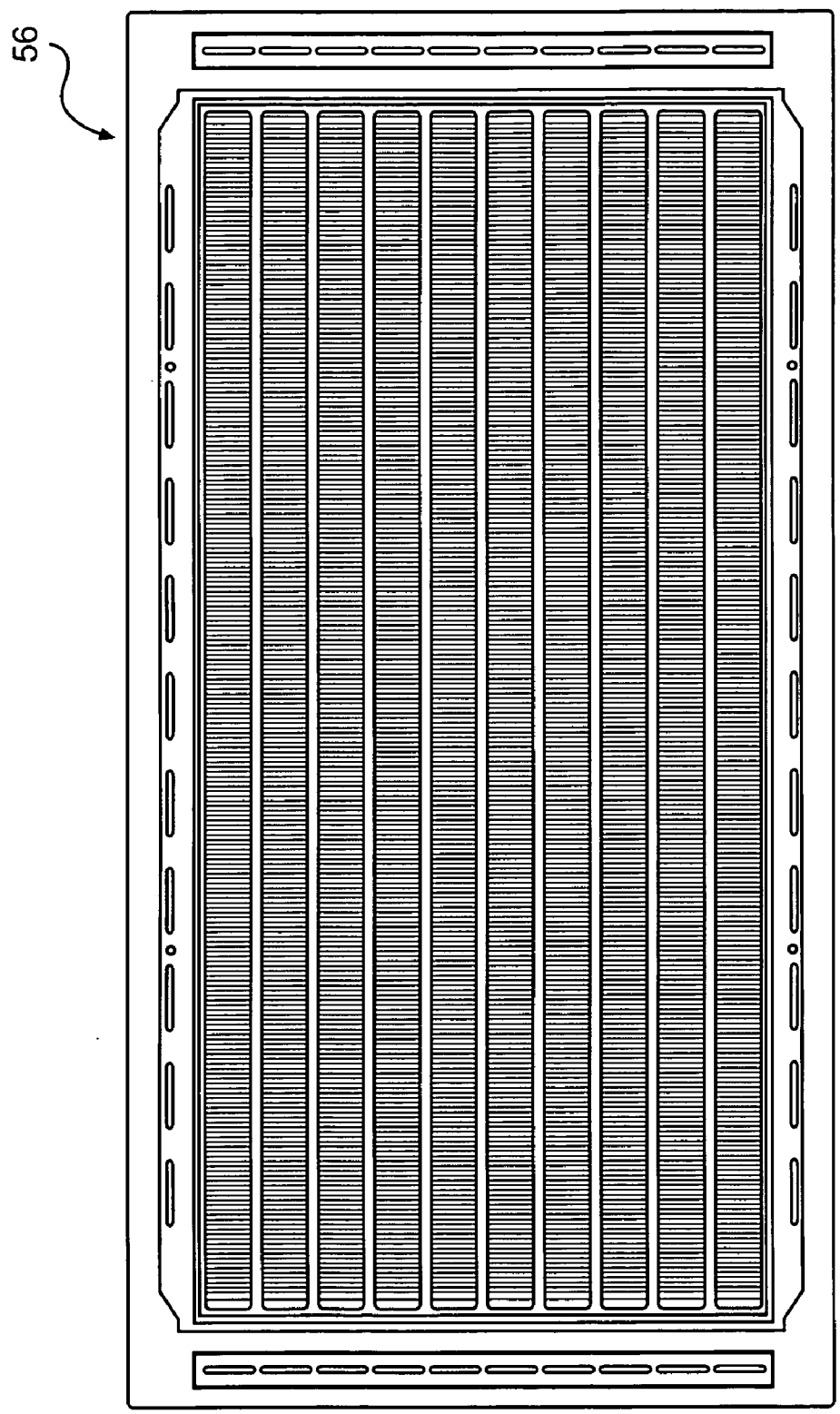
FIG. 2D is a plan view of a gasket of the fuel deoxygenator.
Figure 2E:
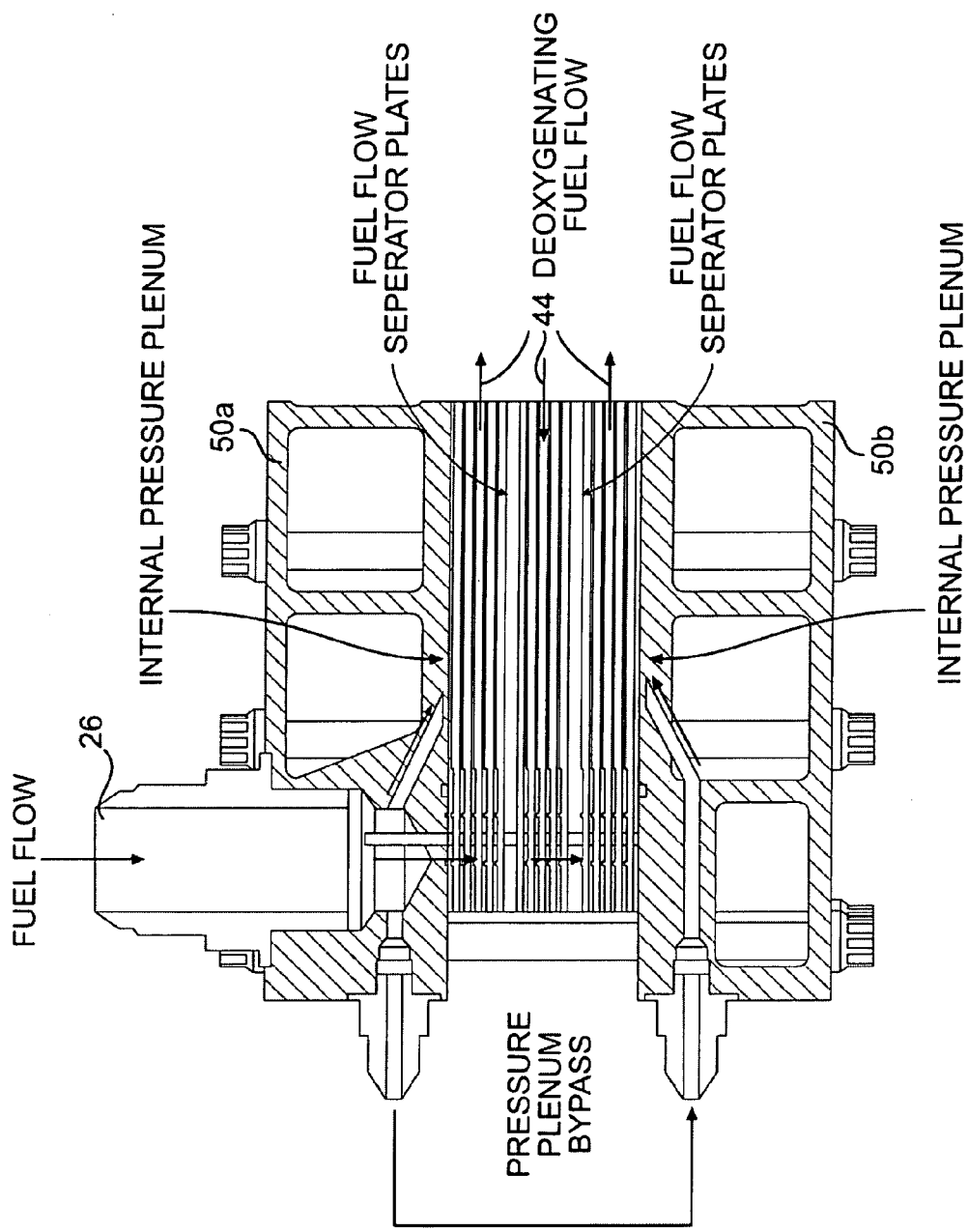
FIG. 2E is an expanded sectional view of the fuel deoxygenator.

Referring to FIG. 2B, one set of plates, which forms one flow-channel assembly 34 of the deoxygenator system 14, includes a flow plate assembly 44 sandwiched adjacent to the oxygen permeable membranes 36 which are supported by a porous support 42 such as non-woven polyester (also illustrated in FIG. 3). It should be understood that the porous substrate, although schematically illustrated, may take various forms. Adjacent one or more assembly 34 is a separator plate 48. The separator plate 48 prevents fuel from leaking across the predefined fuel passages defined by the flow plate assemblies 34. The deoxygenation system 14, irrespective of the number of flow-channel assemblies 34, is sealed by an interface plate 46 and an outer housing plate 50a, 50b, which respectively include the fuel inlet 26, the vacuum port 29, and the fuel outlet 30 (also illustrated in FIGS. 2A and 2E).

The outer housing plates 50a, 50b in one non-limiting embodiment are attached together through a multitude of fasteners such as bolts or the like such that the flow-channel assemblies 34 are sandwiched therebetween. The outer housing plates 50a, 50b in one non-limiting embodiment are relatively rigid components which compress the flow-channel assemblies 34 such that sealing between plates is maintained thereby. Although illustrated as rectilinear in the illustrated embodiment, one of ordinary skill in the art will recognize that alternative shapes, sizes, or configurations including non-rigid housings are suitable and within the scope of the invention.

Each flow plate assembly 44 defines a portion of the fuel channel 38 between the inlet 26 and outlet 30. The vacuum port 29 (FIG. 2A) is in communication with the interface plate 46 and the porous support 42 through vacuum ports 29 in the flow plates 52, 54. Vacuum creates a partial pressure gradient within each of the porous supports 42 to extract dissolved oxygen from the fuel channel 38 through the oxygen permeable membrane 36. The oxygen is then expelled through the vacuum port 29.

The specific quantity of flow-channel assemblies 34 are determined by application-specific requirements, such as fuel type, fuel temperature, and mass flow demand from the engine. Further, different fuels containing differing amounts of dissolved oxygen may require differing amounts of deoxygenation to remove a desired amount of dissolved oxygen.

Each flow plate assembly 44 defines one fuel channel 38 (FIG. 3) between the inlet 26 and outlet 30 (FIG. 2A). In one non-limiting embodiment a multitude of parallel flow channels 38 are defined between the inlet 26 and outlet 30 by a multitude of the flow-channel assemblies 34 within the deoxygenator system 14. The configuration of each fuel channel 38 in one non-limiting embodiment is defined to maximize fuel exposure to the oxygen permeable membrane 36 in order to maximize the amount of dissolved oxygen removed from the fuel. The fuel channels 38 in one non-limiting embodiment are small enough that fuel is in contact with the oxygen permeable membrane 36 but also large enough so as to not restrict fuel flow.

Each flow plate assembly 44 includes a first flow plate 52, a second flow plate 54, and a flow plate gasket 56 (also illustrated separately in FIG. 2D) therebetween. It should be understood that the flow plate assembly 44 disclosed in the illustrative embodiment illustrates only two flow plates and a gasket for the sake of clarity, it should be understood that any number of plate assemblies may be located between the outer housing plates 50a, 50b.

The first flow plate 52 and the second flow plate 54 in one non-limiting embodiment are manufactured of a non-metallic material such as a thermoplastic, for instance polyphenylene sulfide (PPS), or more specifically up to 20 wt % carbon fiber filled PPS. The first fuel plate 52 and the second fuel plate 54 in one non-limiting embodiment are manufactured of a non-metallic material such as KAPTON® film manufactured by E. I. du Pont de Nemours and Company of Delaware USA. It should be understood that other plastics that are compatible with fuel and are electrically conductive (to prevent static charge buildup) may alternatively be utilized as well as materials which are machined rather than molded.

The first flow plate 52 and the second flow plate 54 include flow impingement elements 55 (FIGS. 2C and 3) which increase oxygen transport. When the flow plates 52, 54 are assembled together, the flow impingement elements 55 are interleaved and alternate to provide the fuel channel 38 defined by the flow plates 52, 54 with an intricate two-dimensional flow characteristic (FIG. 4). In other words, the flow impingement elements 55 on each flow plate 52, 54 extend above the planar surface of their respective flow plates 52, 54. When the flow plates 52, 54 are assembled together with the gasket 56 to form the flow plate assembly 44, the flow impingement elements 55 form a complete fuel channel 38 in which the flow impingement elements 55 from adjacent flow plates 52, 54 extend (FIG. 3).

The flow impingement elements 55 enhance transport of oxygen from the bulk flow to the membrane surface, while the non-metallic material minimizes weight and sharp edges which may otherwise damage the oxygen permeable membranes 36. The flow impingement elements 55 of the deoxygenator system 14 enhance contact between fuel flow and the composite oxygen permeable membrane 36 to increase mass transport of dissolved oxygen.

Fuel flowing through the fuel channel 38 is in contact with the oxygen permeable membrane 36. Vacuum creates an oxygen partial pressure differential between the inner walls of the fuel channel 38 and the composite oxygen permeable membrane 36 which causes diffusion of oxygen dissolved within the fuel to migrate through the porous support 42 which supports the membrane 36 and out of the deoxygenator system 14 through the oxygen receiving channel 40 separate from the fuel channel 38. For further understanding of other aspects of one membrane based fuel deoxygenator system and associated components thereof, attention is directed to U.S. Pat. No. 6,315,815 entitled MEMBRANE BASED FUEL DEOXYGENATOR; U.S. Pat. No. 6,939,392 entitled SYSTEM AND METHOD FOR THERMAL MANAGEMENT and U.S. Pat. No. 6,709,492 entitled PLANAR MEMBRANE DEOXYGENATOR which are assigned to the assignee of the instant invention and which are hereby incorporated herein in their entirety.

The first fuel plate 52 and the second fuel plate 54 include flow impingement elements 55 (FIG. 2) which form ridges which increase oxygen diffusivity through fuel agitation.

Figure 4A:
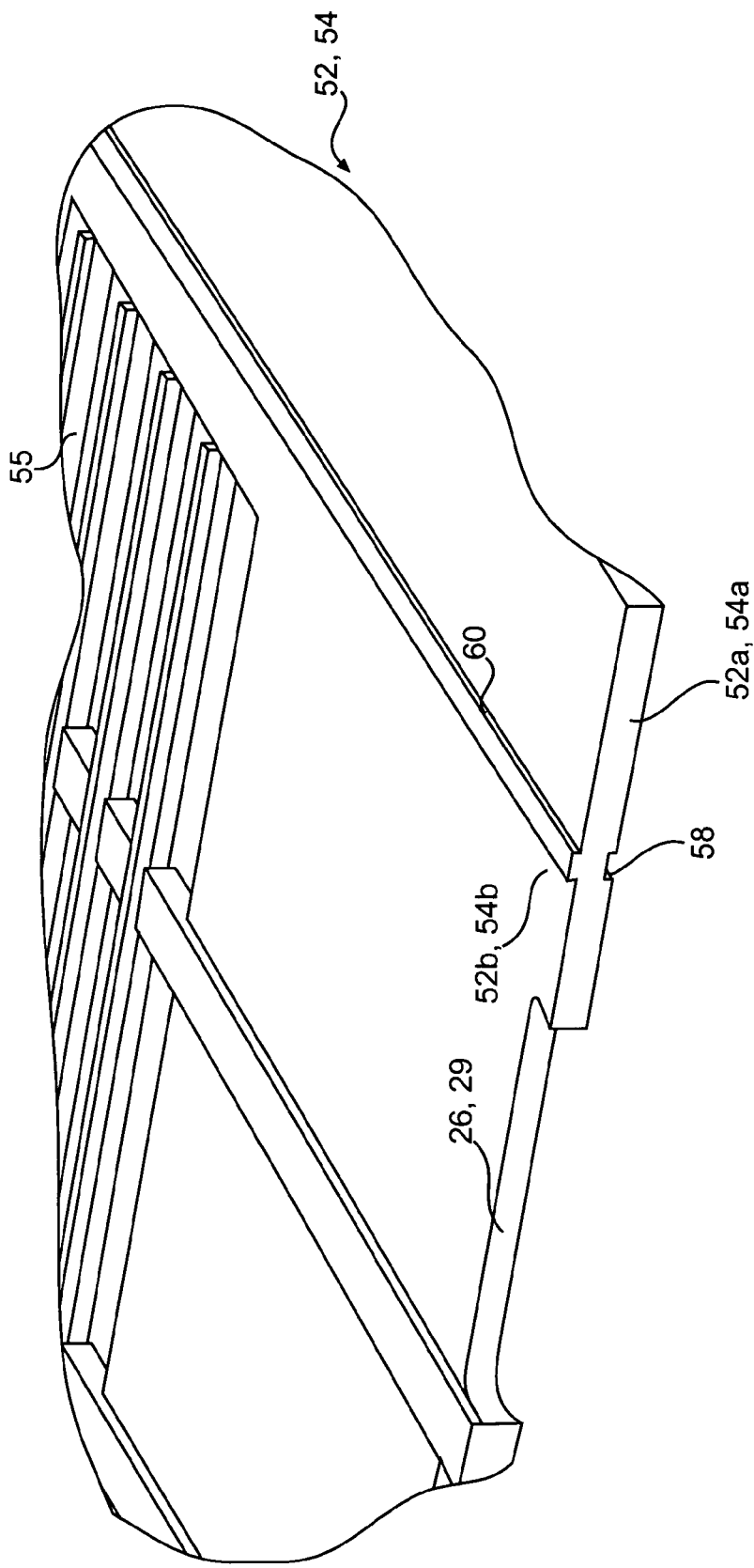
FIG. 4A is an expanded top view of a fuel plate of the fuel deoxygenator.
Figure 4B:
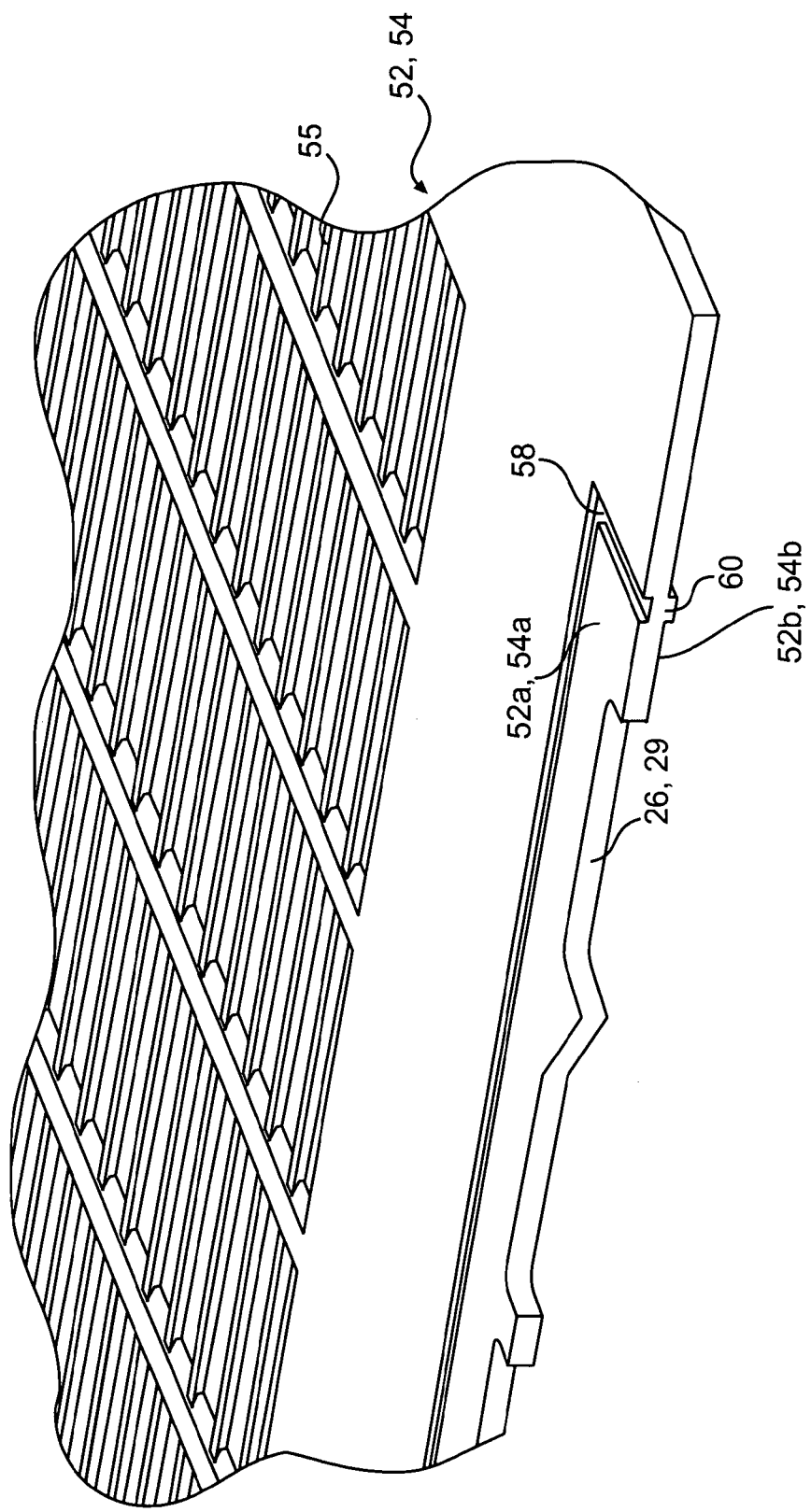
FIG. 4B is an expanded bottom view of the fuel plate of FIG. 4A.
Figure 4C:
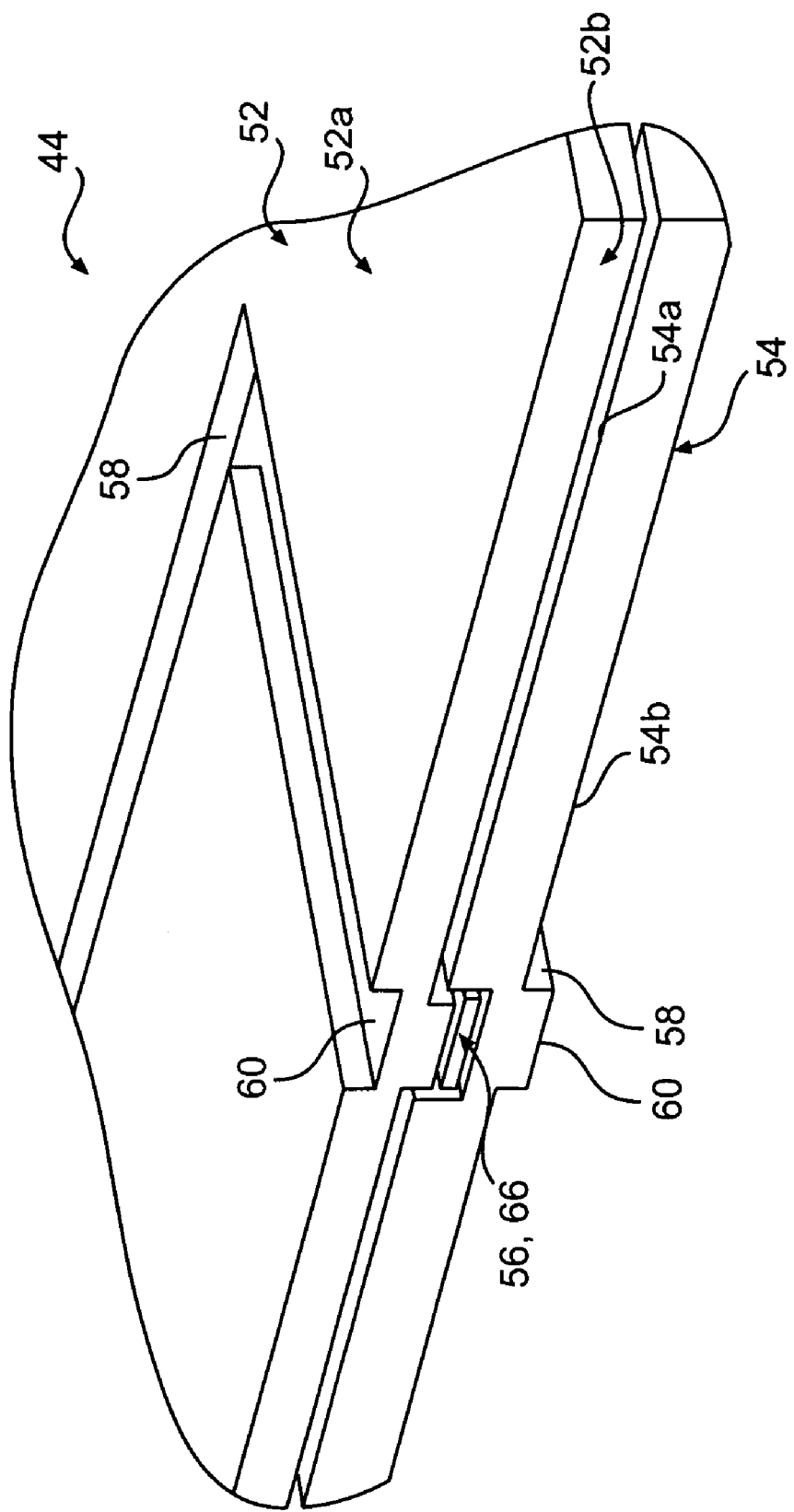
FIG. 4C is an expanded perspective view of a groove and up-standing member interface with a gasket between a first and a second fuel plate.
Figure 4D:
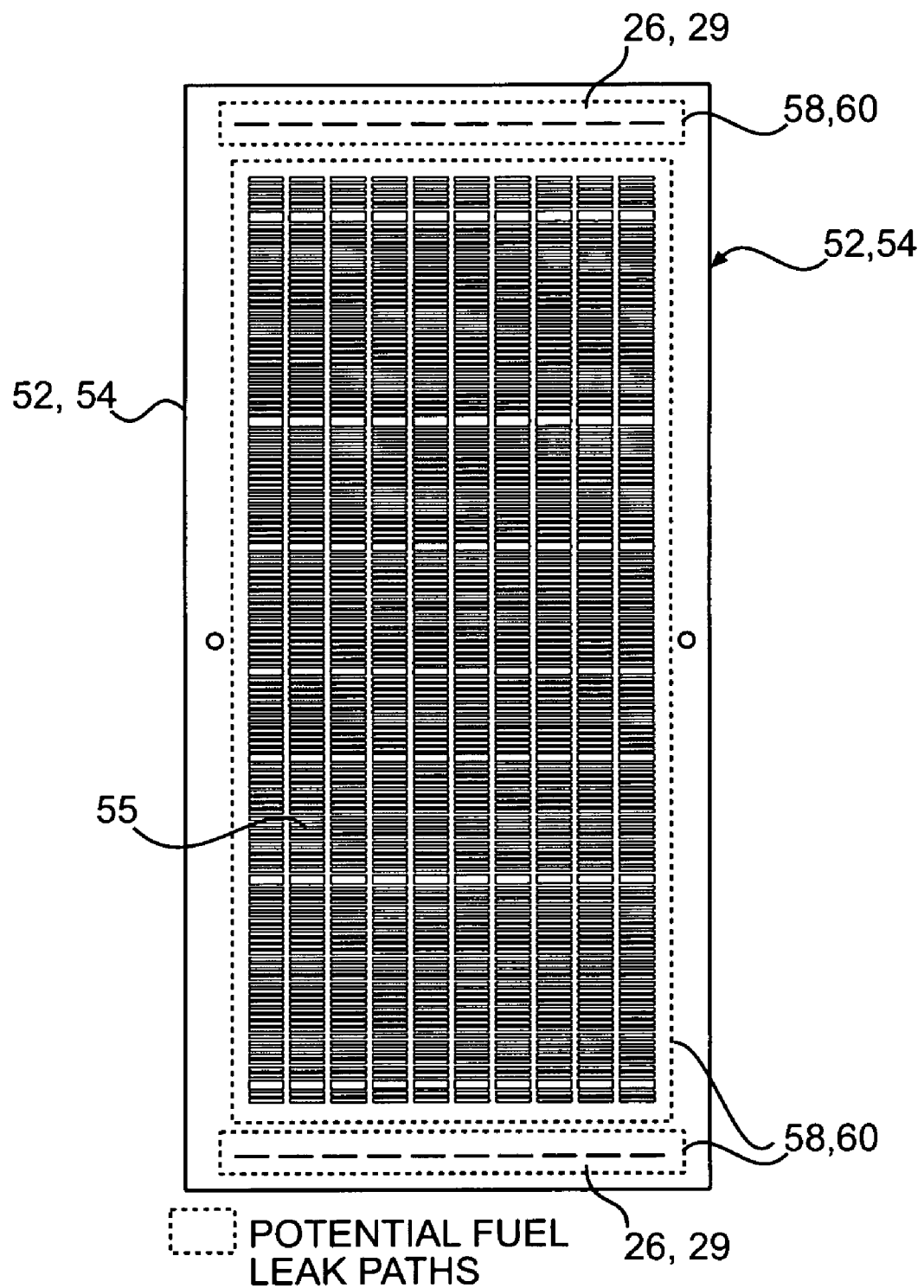
FIG. 4D is an expanded plan view of a fuel plate illustrating a fuel gasket location.

Referring to FIGS. 4A, 4B, each fuel plate 52, 54 includes a groove 58 which seals fuel flow on one side 52a, 54a and an up-standing ridge member 60 on an opposite side 52b, 54b. The groove 58 receives the fuel plate gasket 56 to seal the fuel plate assembly 44 (FIG. 4C). It should be understood that in addition to the gasket 56 (FIG. 3D), other sealing materials such as adhesive film and epoxy liquid may alternatively or additionally be utilized. The groove 58 and up-standing ridge member 60 in one non-limiting embodiment are defined about the fuel plates 52, 54 in a location which may be fuel leak paths (FIG. 4D). The groove 58 and up-standing ridge member 60 in one non-limiting embodiment are directly opposed such that the fuel plate 52, 54 material thicknesses is equivalent throughout. That is, the groove 58 extends into the planar surface 52a, 54a of the fuel plates 52, 54 for a depth generally equivalent to a depth with which the up-standing ridge member 60 extends from the planar surface 52b, 54b of the fuel plates 52, 54.

Figure 4E:
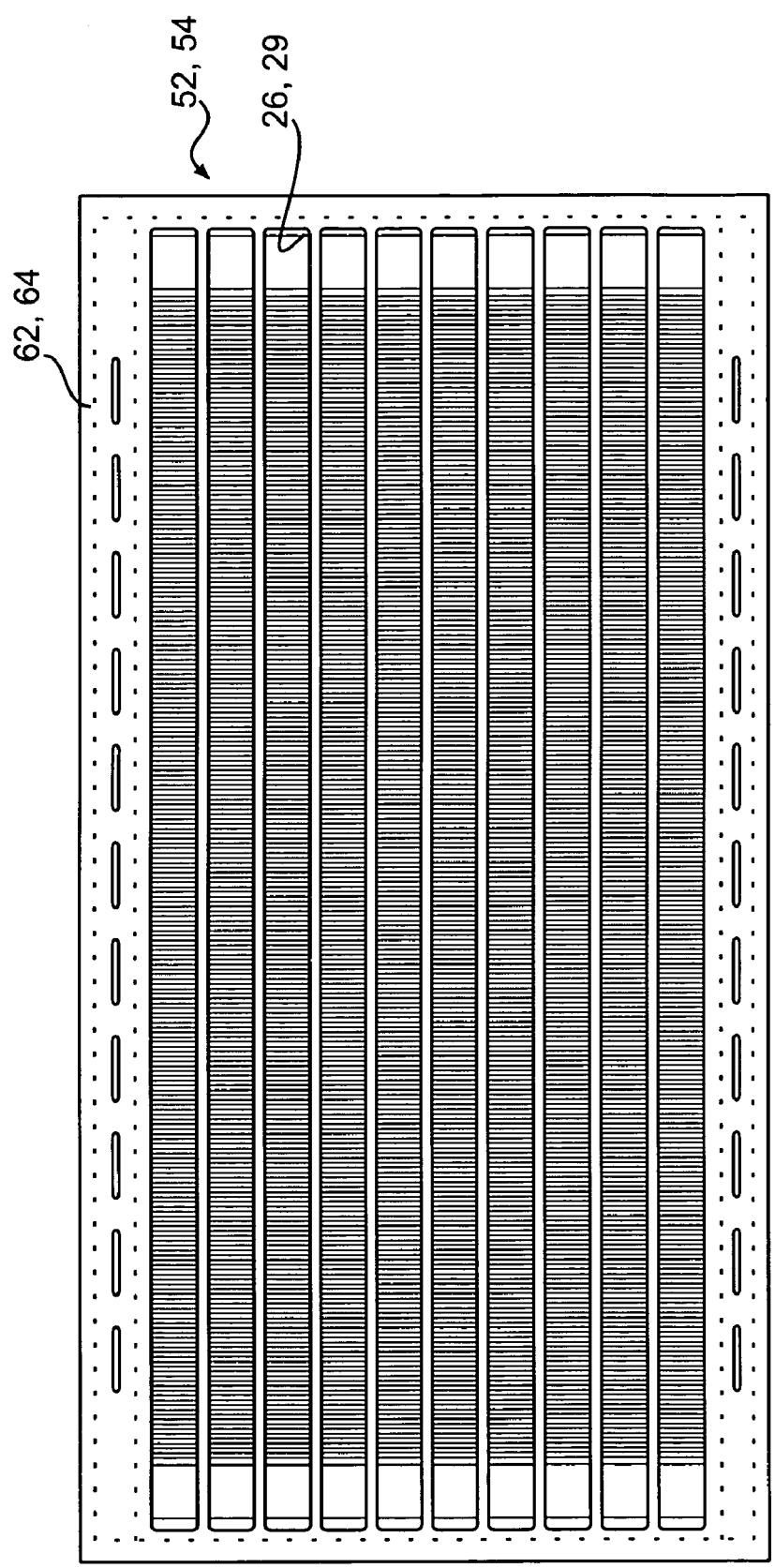
FIG. 4E is an expanded plan view of a fuel plate illustrating a vacuum gasket location.
Figure 4F:
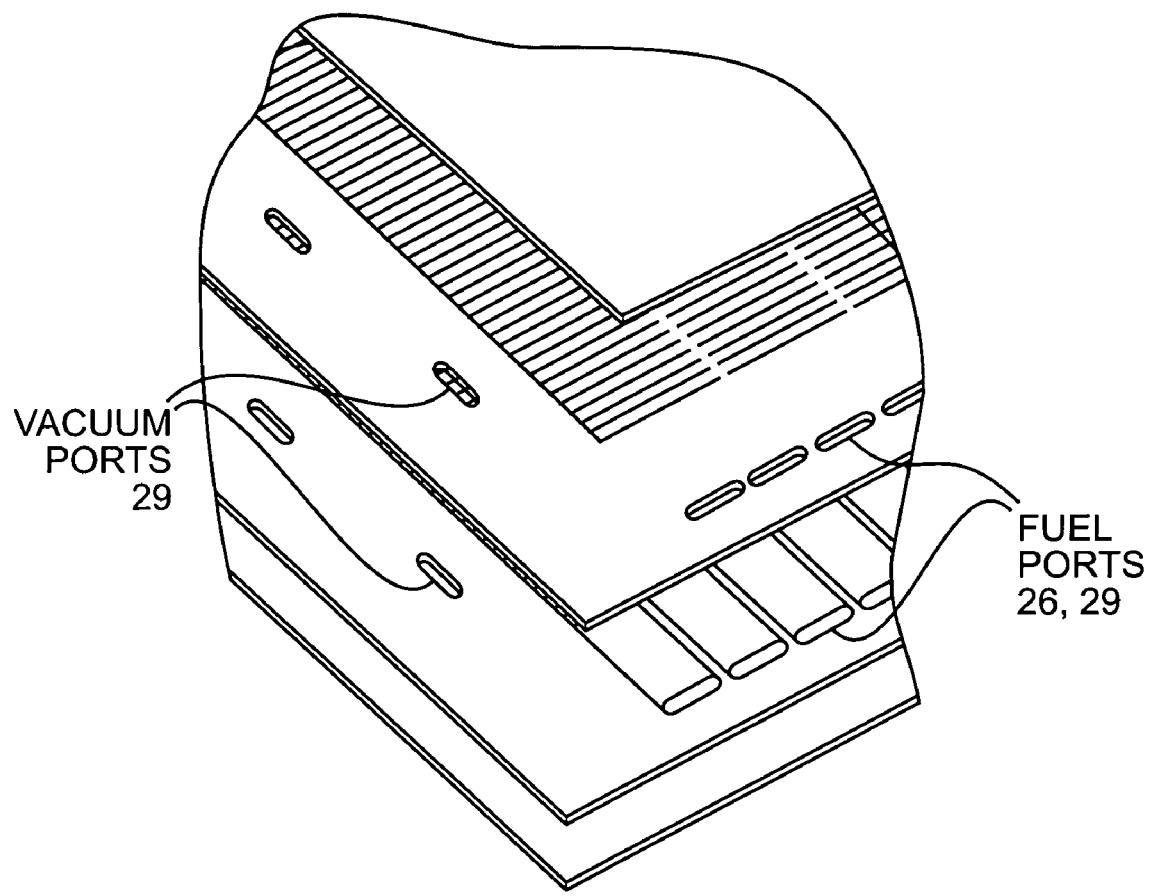
FIG. 4F is an expanded perspective view of a multiple of fuel plates illustrating a fuel port and vacuum port location.
Figure 4G:
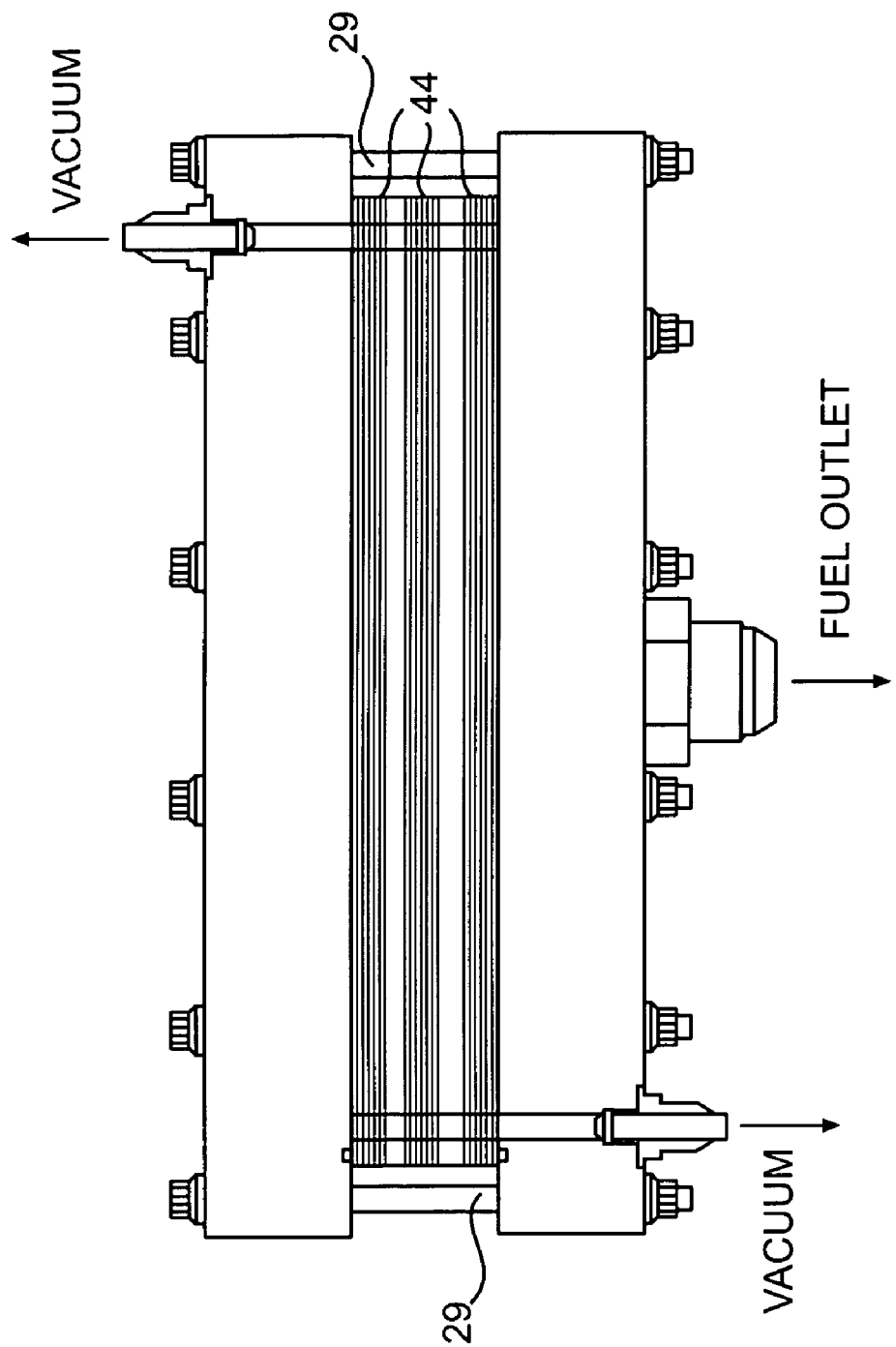
FIG. 4G is an expanded sectional view taken along a short axis of the fuel deoxygenator illustrating inter plate vacuum ports.
Figure 4H:
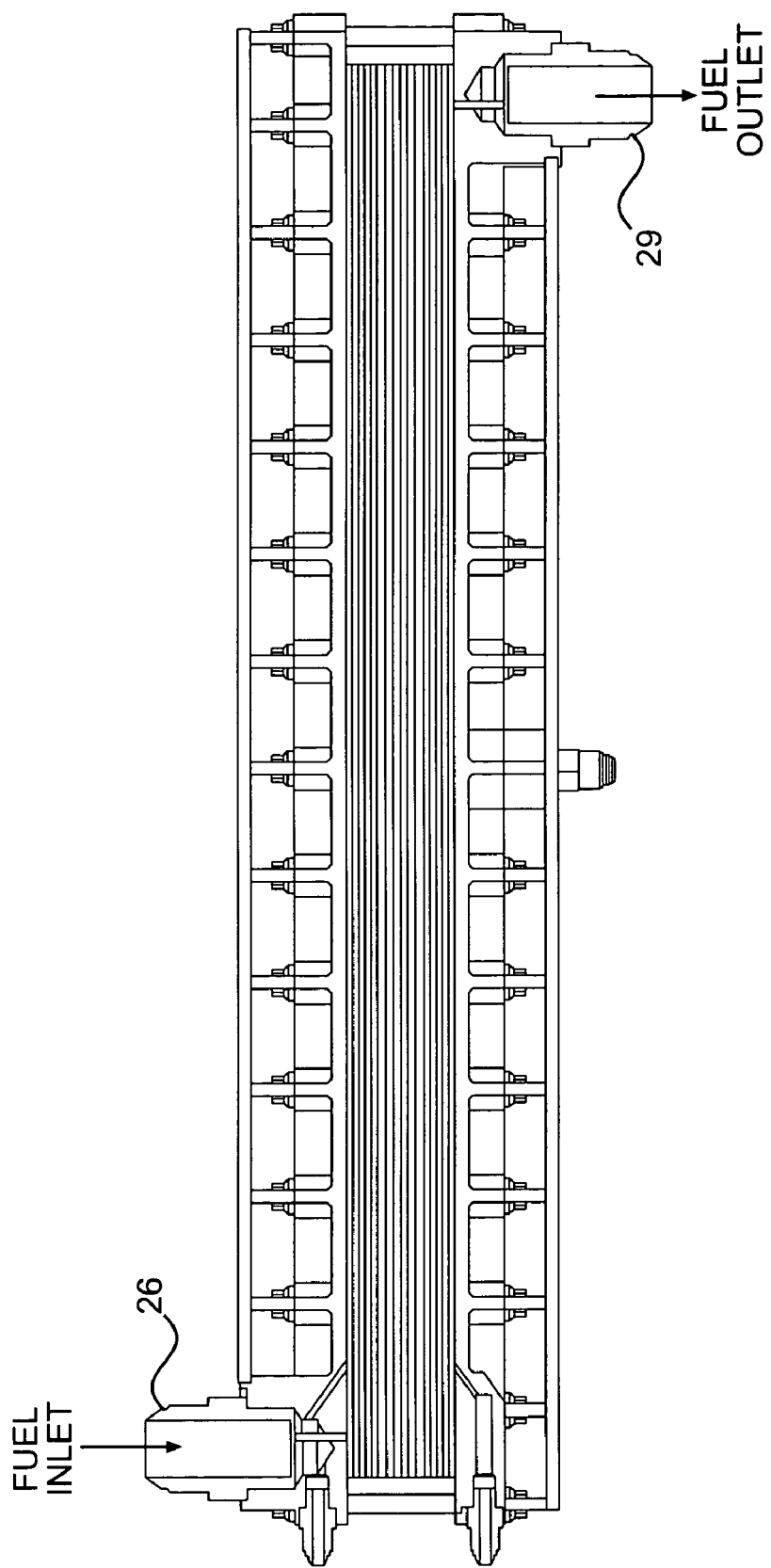
FIG. 4H is an expanded sectional view taken along a long axis of the fuel deoxygenator illustrating inter plate fuel communication.

Each fuel plate 52, 54 further includes a groove 62 (FIG. 4E) which seals vacuum channel on one side 52a, 54a and an up-stand ridge member 64 on the opposite side 52b, 54b which receives a fuel plate vacuum gasket 66 (FIG. 4C) to seal the fuel plate assembly 44 in a manner similar to that of groove 58 and up-standing ridge member 60. The groove 62 and up-stand ridge member 64 in one non-limiting embodiment are defined about the fuel plates 52, 54 in a location which may be may be a vacuum leak paths (FIG. 4E). It should be understood that although only the fuel plates 52, 54 are illustrated in the disclosed embodiment, each plate in one non-limiting embodiment includes a groove-gasket-upstanding ridge member interface to assure sealing and provide alignment and interlocking during assembly of adjacent plates. The vacuum ports 29 and fuel inlets and outlets 26, 29 which provide communication between multiples of fuel plate assemblies 44 (FIG. 3C) are respectively located on a long side (FIG. 4G) and a short side (FIG. 4H) of the deoxygenator system 14 (FIG. 4F).

Laser-cut is one preferred technique to manufacture the high precision sealing gaskets and fuel plates 52, 54. The KAPTON® or other such like non-metallic materials in one non-limiting embodiment is cut with a computer-controlled, high-tolerance laser such as a $CO_2$ laser, and a CAD design file of the desired sealing gasket and fuel plate configuration. The laser is programmed to follow the pattern required to cut the sealing gasket and fuel plate fuel channel shape. Laser cutting may be performed either in stages or layers of material, which may then be assembled together, or cutting may be accomplished in a single operation to render a complete fuel plate, e.g fuel plate 52, 54 is formed as a single plate. Laser cutting provides a cost-effective manufacturing technique for massive production of high-tolerance sealing gasket and fuel plates. A laser-cut high-tolerance sealing gasket, particularly made with a rubber-type sealing material, provides leak-free assembly. Advantages utilizing laser cut technique for fabricating high-tolerance sealing gaskets and the adjacent fuel plates is particularly relevant to a multilayer FSU assembly (FIG. 3A).

Water jet cutting as generally understood is another effective technique for fabricating high precision FSU seals and fuel plate in accordance with the present invention. Waterjet cutting has absolute repeatability and does not affect material properties or the temperature.

Electrical discharge machining (EDM) as generally understood is yet another effective technique for fabricating high precision FSU seals and fuel plates in accordance with the present invention. EDM manufacturing is quite affordable and a very desirable manufacturing process when low counts or high accuracy is required.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fuel plate assembly for a deoxygenator system comprising:
    a first non-metallic fuel plate which defines a first portion of a fuel channel, a multiple of first laminar flow impingement elements which extend at least partially above said first portion of said fuel channel defined by said first non-metallic fuel plate;
    a second non-metallic fuel plate which defines a second portion of said fuel channel, a multiple of second laminar flow impingement elements which extend at least partially above said second portion of said fuel channel defined by said second non-metallic fuel plate, said multitude of second laminar flow impingement elements interleaved with said multitude of first laminar flow impingement elements within said fuel channel;
    a first groove on one side of said first non-metallic fuel plate about a periphery of said first multitude of laminar flow impingement elements, a first up-standing ridge member on an opposite side of said first nonmetallic fuel plate about said periphery of said first multitude of laminar flow impingement elements, said first groove and said first up-standing ridge directly opposed, a second groove on one side of said second non-metallic fuel plate about a periphery of said second multitude of laminar flow impingement elements, a second up-standing ridge member on an opposite side of said second nonmetallic fuel plate about said periphery of said second multitude of laminar flow impingement elements, said second groove and said second up-standing ridge directly opposed such that said first upstanding ridge is received within said second groove; and
    a gasket mounted within said second groove to seal said first portion of said fuel channel with said second portion of said fuel channel.

2. The fuel plate assembly as recited in claim 1, wherein said first non-metallic fuel plate and said second non-metallic fuel plate are rectilinear.

3. The fuel plate assembly as recited in claim 1, further comprising a gasket mounted between said first non-metallic fuel plate and said second non-metallic fuel plate.

4. A fuel plate assembly for a deoxygenator system comprising:
    a first nonmetallic fuel plate which defines a first portion of a fuel channel, a multiple of first laminar flow impingement elements which extend at least partially above said first portion of said fuel channel defined said first non-metallic fuel plate; and
    a second non-metallic fuel plate which defines a second portion of said fuel channel, a multiple of second laminar flow impingement elements which extend at least partially above said second portion of said fuel channel defined by said second non-metallic fuel plate, said multitude of second laminar flow impingement elements interleaved with said multitude of first laminar flow impingement elements within said fuel channel,
    a first groove on one side of said first non-metallic fuel plate about a periphery of said first multitude of laminar flow impingement elements, a first up-standing ridge member on an opposite side of said first non-metallic fuel plate about said periphery of said first multitude of laminar flow impingement elements, said first groove and said first up-standing ridge directly opposed, a second groove on one side of said second non-metallic fuel plate about a periphery of said second multitude of laminar flow impingement elements, a second up-standing ridge member on an opposite side of said second non-metallic fuel plate about said periphery of said second multitude of laminar flow impingement elements, said second groove and said second up-standing ridge directly opposed such that said first upstanding ridge is received within said second groove.

5. A deoxygenator system comprising:
    a first non-metallic fuel plate which defines a first multitude of laminar flow impingement elements formed within a first portion of a fuel channel, a first groove on one side of said first non-metallic fuel plate about a periphery of said first multitude of laminar flow impingement elements, a first up-standing ridge member on an opposite side of said first non-metallic fuel plate about said periphery of said first multitude of laminar flow impingement elements, said first groove and said first up-standing ridge directly opposed;
    a second non-metallic fuel plate which defines a second multitude of laminar flow impingement elements formed within a second portion of said fuel channel, said second multiple of laminar flow impingement elements interleaved with said first multitude of laminar flow impingement elements, a second groove on one side of said second non-metallic fuel plate about a periphery of said second multitude of laminar flow impingement elements, a second up-standing ridge member on an opposite side of said second non-metallic fuel plate about said periphery of said second multitude of laminar flow impingement elements, said second groove and said second up-standing ridge directly opposed such that said first upstanding ridge is received within said second groove;

a gasket mounted within said second groove to seal said first portion of said fuel channel with said second portion of said fuel channel;

an oxygen receiving channel; and an oxygen permeable membrane in communication with said fuel channel and said oxygen receiving channel.

6. The deoxygenator system as recited in claim 5, wherein said first non-metallic fuel plate and said second non-metallic fuel plate are identical.

7. The deoxygenator system as recited in claim 5, wherein said first non-metallic fuel plate and said second non-metallic fuel plate are manufactured of KAPTON®.

8. The deoxygenator system as recited in claim 5, further comprising a first outer housing plate and a second outer housing plate which compresses said first non-metallic fuel plate, said second non-metallic fuel plate, said gasket and said oxygen permeable membrane.

9. The deoxygenator system as recited in claim 5, wherein said first non-metallic fuel plate and said second non-metallic fuel plate are rectilinear.

10. The deoxygenator system as recited in claim 5, further comprising:

a multiple of first laminar flow impingement elements which extend at least partially above said first portion of said fuel channel defined by said first non-metallic fuel plate and a multiple of second laminar flow impingement elements which extend at least partially above said second portion of said fuel channel defined by said second non-metallic fuel plate, said second multitude of laminar flow impingement elements interleaved with said multitude of first laminar flow impingement elements within said fuel channel.

11. A deoxygenator system comprising:

a first non-metallic fuel plate which defines a first multitude of laminar flow impingement elements formed within a first portion of a fuel channel, a first groove on one side of said first non-metallic fuel plate about a periphery of said first multitude of laminar flow impingement elements, a first up-standing ridge member on an opposite side of said first non-metallic fuel plate about said periphery of said first multitude of laminar flow impingement elements, said first groove and said first up-standing ridge directly opposed; and a second non-metallic fuel plate which defines a second multitude of laminar flow impingement elements formed within a second portion of said fuel channel, said second multiple of laminar flow impingement elements interleaved with said first multitude of laminar flow impingement elements, a second groove on one side of said second non-metallic fuel plate about a periphery of said second multitude of laminar flow impingement elements, a second up-standing ridge member on an opposite side of said second non-metallic fuel plate about said periphery of said second multitude of laminar flow impingement elements, said second groove and said second up-standing ridge directly opposed such that said first upstanding ridge is received within said second groove to seal said first portion of said fuel channel with said second portion of said fuel channel.

12. The deoxygenator system as recited in claim 11, further comprising a gasket mounted within said groove, said upstanding ridge member receivable within said groove to contact said gasket and seal said first portion of said fuel channel with said second portion of said fuel channel.

13. The deoxygenator system as recited in claim 12, further comprising a first outer housing plate and a second outer housing plate which compresses said first non-metallic fuel plate, said second non-metallic fuel plate and said gasket.

14. The deoxygenator system as recited in claim 11, wherein said first non-metallic fuel plate and said second non-metallic fuel plate are manufactured of KAPTON ®.

15. The deoxygenator system as recited in claim 11, wherein said first non-metallic fuel plate and said second non-metallic fuel plate are identical.

16. The deoxygenator system as recited in claim 11, wherein said first non-metallic fuel plate and said second non-metallic fuel plate are rectilinear.

17. The deoxygenator system as recited in claim 11, further comprising:

a multiple of first laminar flow impingement elements which extend at least partially above said first portion of said fuel channel defined by said first non-metallic fuel plate and a multiple of second laminar flow impingement elements which extend at least partially above said second portion of said fuel channel defined by said second non-metallic fuel plate, said second multitude of laminar flow impingement elements interleaved with said multitude of first laminar flow impingement elements within said fuel channel.

* * * * *

UNITED STATES PATENT AND TRADEMARK OFFICE
CERTIFICATE OF CORRECTION

| | | |
|---|---|---|
| PATENT NO. | : 7,569,099 B2 | Page 1 of 1 |
| APPLICATION NO. | : 11/334590 | |
| DATED | : August 4, 2009 | |
| INVENTOR(S) | : Coffin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Seventh Day of September, 2010

David J. Kappos
*Director of the United States Patent and Trademark Office*